(12) United States Patent
Hancock

(10) Patent No.: US 11,794,744 B2
(45) Date of Patent: Oct. 24, 2023

(54) CONTROL SYSTEM FOR A VEHICLE

(71) Applicant: JAGUAR LAND ROVER LIMITED, Coventry (GB)

(72) Inventor: Matthew Hancock, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 556 days.

(21) Appl. No.: 16/971,484

(22) PCT Filed: Feb. 25, 2019

(86) PCT No.: PCT/EP2019/054513
§ 371 (c)(1),
(2) Date: Aug. 20, 2020

(87) PCT Pub. No.: WO2019/162479
PCT Pub. Date: Aug. 29, 2019

(65) Prior Publication Data
US 2020/0385001 A1 Dec. 10, 2020

(30) Foreign Application Priority Data
Feb. 26, 2018 (GB) ..................... 1803049

(51) Int. Cl.
*B60W 30/18* (2012.01)
*B60L 15/20* (2006.01)
(Continued)

(52) U.S. Cl.
CPC ... *B60W 30/18063* (2013.01); *B60L 15/2009* (2013.01); *B60L 15/2063* (2013.01);
(Continued)

(58) Field of Classification Search
None
See application file for complete search history.

(56) References Cited

U.S. PATENT DOCUMENTS

| | | | |
|---|---|---|---|
| 2009/0203496 A1* | 8/2009 | Staub | B60W 30/18063 701/87 |
| 2012/0022735 A1* | 1/2012 | Tashiro | B60L 7/18 701/22 |

(Continued)

FOREIGN PATENT DOCUMENTS

| | | |
|---|---|---|
| CN | 102050119 A | 5/2011 |
| CN | 103386965 A | 11/2013 |

(Continued)

OTHER PUBLICATIONS

International Search Report and Written Opinion, PCT/EP2019/054513, dated Jul. 9, 2019.

(Continued)

*Primary Examiner* — Todd Melton
*Assistant Examiner* — Jason R Roberson
(74) *Attorney, Agent, or Firm* — McCoy Russell LLP

(57) ABSTRACT

The present disclosure relates to a creep speed control system for a vehicle having at least one electric motor for providing torque to at least one vehicle wheel. The system comprises an input configured to receive a current speed signal indicative of a current speed of the vehicle; a creep speed control module that is configured to activate when the current speed of the vehicle crosses a predetermined threshold above a creep speed target value; and, an output configured to, upon activation of the creep speed control module, send a creep speed control torque signal to the at least one electric motor to control the vehicle speed in dependence on the creep speed target value, wherein the creep speed control torque signal is limited to a creep speed control filtered torque value less than a creep speed control maximum torque value.

19 Claims, 5 Drawing Sheets

(51) Int. Cl.
*B60W 10/08* (2006.01)
*B60L 50/60* (2019.01)
*B60W 50/00* (2006.01)

(52) U.S. Cl.
CPC ............ *B60L 50/60* (2019.02); *B60W 10/08* (2013.01); *B60L 2240/12* (2013.01); *B60L 2240/421* (2013.01); *B60L 2240/423* (2013.01); *B60L 2240/80* (2013.01); *B60L 2250/26* (2013.01); *B60L 2260/28* (2013.01); *B60W 2050/0042* (2013.01); *B60W 2050/0096* (2013.01); *B60W 2520/10* (2013.01); *B60W 2710/0666* (2013.01)

(56) References Cited

U.S. PATENT DOCUMENTS

| | | | |
|---|---|---|---|
| 2013/0012355 A1 | 1/2013 | Yamazaki et al. | |
| 2014/0129068 A1* | 5/2014 | Higa | B60K 6/445 701/1 |
| 2015/0111693 A1* | 4/2015 | Wang | B60W 20/50 180/65.265 |
| 2017/0297575 A1 | 10/2017 | Das et al. | |

FOREIGN PATENT DOCUMENTS

| | | |
|---|---|---|
| CN | 105365811 A | 3/2016 |
| CN | 105460004 A | 4/2016 |
| CN | 105555628 A | 5/2016 |
| CN | 106427664 A | 2/2017 |
| CN | 106926745 A | 7/2017 |
| DE | 102009052227 A1 | 5/2011 |
| DE | 102012211402 A1 | 1/2013 |
| DE | 112013005684 T5 | 10/2015 |
| DE | 102014223609 A1 | 12/2015 |
| EP | 2444293 A1 | 4/2012 |

OTHER PUBLICATIONS

Combined Search and Examination, GB1803049.4, dated Jul. 31, 2018.

State Intellectual Property Office of the People's Republic of China, Office Action and Search Report Issued in Application No. 201980015103.6, dated Feb. 2, 2023, 14 pages. (Submitted with Partial Translation).

State Intellectual Property Office of the People's Republic of China, Office Action and Search Report Issued in Application No. 201980015103.6, dated Aug. 19, 2023, 26 pages.

* cited by examiner

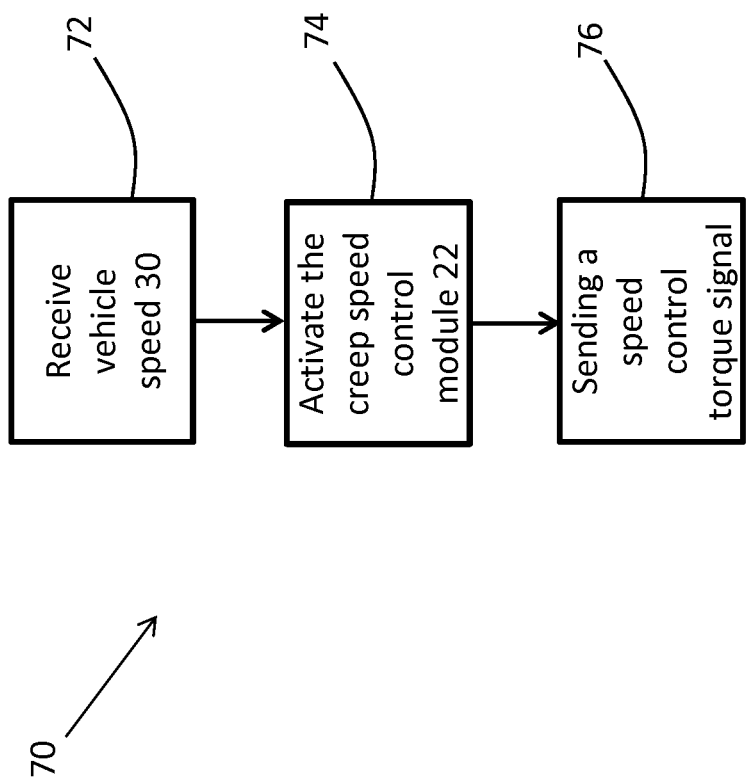

CONTROL SYSTEM FOR A VEHICLE

CROSS-REFERENCE TO RELATED APPLICATIONS

This application is a 371 of International Application No. PCT/EP2019/054513, filed Feb. 25, 2019, which claims priority to GB Patent Application 1803049.4, filed Feb. 26, 2018, the contents of both of which are incorporated by reference herein in their entirety.

TECHNICAL FIELD

The present disclosure relates to a control system for a vehicle and particularly, but not exclusively, to a creep speed control system for a vehicle. Aspects of the invention relate to a system, to a method, to a vehicle, and to a computer-readable storage medium.

BACKGROUND

Many vehicles, such as cars, that have an automatic transmission include a so-called 'creep speed' function, or idle speed function, which maintains the vehicle at a relatively low speed, for example 6 km/h, when the vehicle driver is not depressing either the accelerator pedal or the brake pedal. In such vehicles, the automatic transmission includes a fluid coupling or slipping clutch that connects the output of the internal combustion engine to the wheels of the vehicle. The creep speed is dependent on the engine idle speed and the gear ratio of the gear box. Creep may be particularly useful in situations such as traffic jams, in which the driver is required to stop and start the vehicle many times. The creep function enables the driver to use only the brake pedal to control movement of the vehicle, i.e. depressing brake pedal to stop the vehicle and removing their foot from the brake pedal to allow creep movement of the vehicle in either a forwards or backwards direction.

In vehicles in which one or more electric motors are used to provide drive torque to the vehicle wheels instead of an internal combustion engine, such as a battery electric vehicle (BEV), there is no in-built creep speed function. Unlike in a vehicle having an internal combustion engine in which the engine continues to rotate at idle speed when the driver does not request any drive or brake torque via the accelerator and brake pedals, in a BEV the electric motor(s) do not provide torque to the wheels in such a case.

It may be desirable for a creep speed function to be available to drivers of BEVs that simulates the creep function of a conventional automatic vehicle. There are, however, difficulties with entering such a creep mode in certain situations for a BEV. In particular, in a BEV where the electric motor(s) are permanently connected, or directly connected, to the vehicle wheels, i.e. there is no slipping clutch. This may be problematic in situations in which the torque of the electric motor(s) or machine(s) must switch from a negative value to a positive value. In particular, in such a situation there is the potential for so-called 'backlash', or a thump then oscillations within the driveline, to occur, potentially causing discomfort to the driver and damage to the driveline. Specifically, the gears in the driveline must transition from being meshed in one direction to being meshed in the opposing direction For example, such a situation may arise if a driver releases the accelerator pedal relatively suddenly when traveling at a medium to high speed, such as 50 km/h, i.e. the meshing direction of the gears changes too quickly.

It is an aim of the present invention to address disadvantages associated with the prior art.

SUMMARY OF THE INVENTION

According to an aspect of the present invention there is provided a creep speed control system for a vehicle having at least one electric motor for providing torque to at least one vehicle wheel. The system comprises an input configured to receive a current speed signal indicative of a current speed of the vehicle. The system also comprises a creep speed control module that is configured to activate when the current speed of the vehicle crosses a predetermined threshold above a creep speed target value. The system also comprises an output configured to, upon activation of the creep speed control module, send a creep speed control torque signal to the at least one electric motor to control the vehicle speed in dependence on the creep speed target value. The creep speed control torque signal is limited to a creep speed control filtered torque value less than a creep speed control maximum torque value.

Advantageously, the creep speed control system provides a creep speed function in a vehicle that is powered by one or more electric motors rather than an internal combustion engine. The creep speed function of a conventional automatic vehicle may therefore be simulated within an electric vehicle, providing the driver with a more familiar feel when controlling movement of the vehicle in slow moving traffic, for example. Furthermore, limiting the torque requested at the electric motors may enable, for example, a change in motor torque from negative to positive during creep mode entry to occur more gradually. The ability to filter the value of the maximum allowable torque which may be requested by the creep speed control module at the motors therefore enables the entry to creep mode to be controlled such that backlash within the driveline is reduced or eliminated. A creep speed control system which provides comfortable creep entry to the driver and prevents potential damage to the driveline is therefore provided. In addition, the creep speed control module is 'aware' of the filtering via the creep speed control filtered torque. This means that there is no integrator wind up and no filtering downstream of the creep speed control module, which means that the control module is not destabilized.

The creep speed control torque signal may be limited to the creep speed control filtered torque value during a torque reversal phase in a driveline of the vehicle. This is the period or phase during which the effects of backlash are likely to be most severe or most likely to occur.

The creep speed control filtered torque value may become equal to the speed control maximum torque value an overall prescribed filtering period after activation of the creep speed control module. That is, once the filtering period has elapsed, the likelihood of backlash occurring becomes negligible, and so there is no need to continue to limit the maximum allowable requested torque to below the creep speed control maximum torque value.

The creep speed control filtered torque value may be variable with time.

The creep speed control filtered torque value may increase with time.

The creep speed control filtered torque value may increase at a constant rate.

The creep speed control filtered torque value may increase at a first rate for a first prescribed filtering period less than the overall prescribed filtering period after activation of the creep speed control module.

The creep speed control filtered torque value may increase at a second rate for a second prescribed filtering period after the first prescribed filtering period, the second rate being greater than the first rate.

The creep speed control filtered torque value in the first prescribed filtering period may be less than the speed control torque value needed to maintain the vehicle speed at the creep speed target value.

In the first prescribed filtering period, the rate at which the creep speed control torque signal, i.e. the requested motor torque, increases after activation of the creep speed control module is limited, thereby guarding against backlash during the torque reversal phase. In the second prescribed filtering period, the rate at which the creep speed control torque signal increases is still limited, but to a lesser degree than in the first filtering period. The first and second prescribed filtering periods therefore provide the benefit of guarding against backlash within the vehicle driveline, whilst still allowing the vehicle to reach the target creep speed without a noticeable lag, which may be inconvenient to the driver. That is, the speed control performance, i.e. the ability to maintain the creep speed target value, is not compromised.

The creep speed control filtered torque value may be zero when the creep speed control module is activated.

The creep speed control module may be configured to deactivate when a driver demanded torque is non-zero and the vehicle speed is greater than the creep speed target value.

The creep speed control module may be selectively operable by the vehicle driver.

In accordance with another aspect of the invention there is provided a creep speed control method for a vehicle having at least one electric motor for providing torque to at least one vehicle wheel. The method comprises receiving a current speed signal indicative of a current speed of the vehicle. The method also comprises activating a creep speed control module when the current speed of the vehicle crosses a predetermined threshold above a creep speed target value. The method also comprises, upon activation of the creep speed control module, sending a creep speed control torque signal to the at least one electric motor to control the vehicle speed in dependence on the creep speed target value. The creep speed control torque signal is limited to a creep speed control filtered torque value less than a creep speed control maximum torque value.

In accordance with another aspect of the invention there is provided a vehicle comprising a system as described above, or configured to perform a method as described above.

The vehicle may be a battery electric vehicle.

The vehicle may comprise a first electric motor to provide torque to at least one front wheel of the vehicle and a second electric motor to provide torque to at least one rear wheel of the vehicle.

In accordance with another aspect of the invention there is provided a non-transitory, computer-readable storage medium storing instructions thereon that when executed by one or more processors may cause the one or more processors to carry out the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
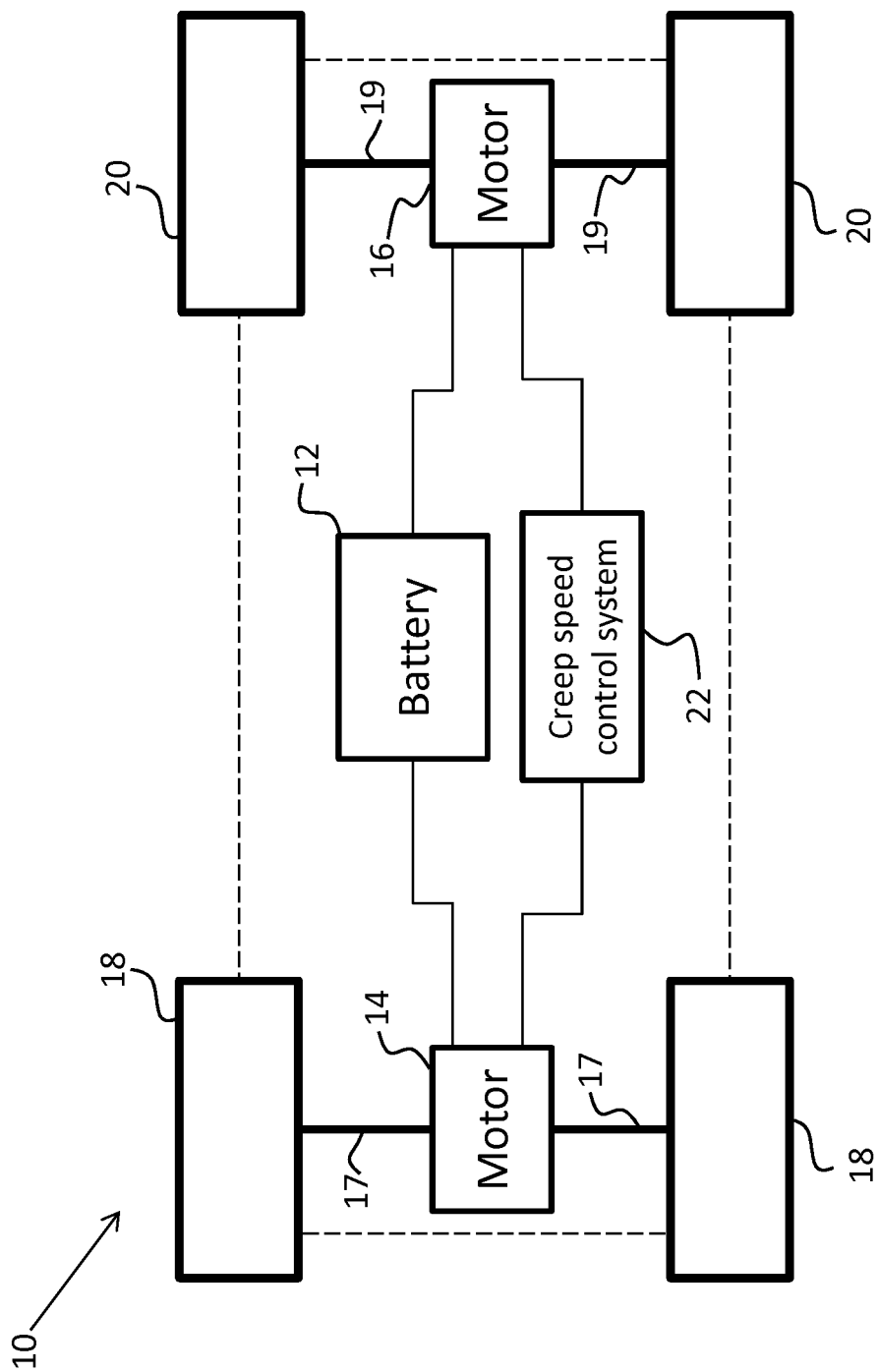
FIG. 1 is a schematic illustration of the powertrain of a battery electric vehicle (BEV) including a creep speed control system according to an embodiment of an aspect of the invention.
Figure 4:
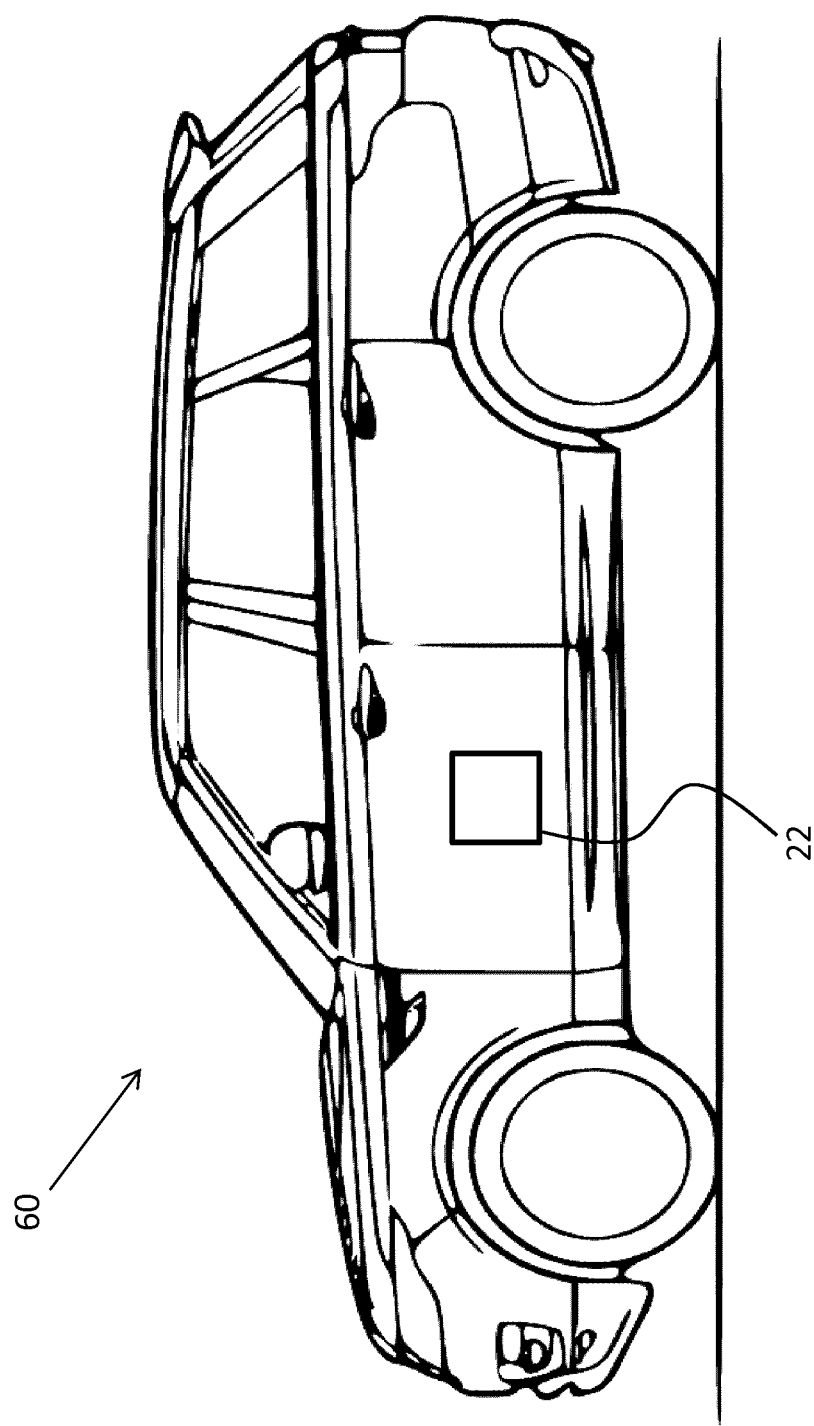
FIG. 4 is a schematic illustration of the BEV including the creep speed control system of FIG. 1; and, FIG. 5 shows the steps of a method performed by the creep speed control system of FIG. 1 according to an embodiment of an aspect of the invention.

FIG. 1 is a schematic illustration of the powertrain 10 of a battery electric vehicle 60 (BEV) (shown in FIG. 4). The vehicle powertrain 10 has a battery 12 which provides electric power to two electric motors or machines 14, 16. The first motor 14 is connected to the front wheels 18 of the vehicle 60, and provides drive or brake torque to the front wheels 18. Similarly, the second motor 16 is connected to the rear wheels 20 of the vehicle 60, and provides drive or brake torque to the rear wheels 20. The motors 14, 16 are permanently (or directly) connected to the wheels 18, 20 via respective driveshafts 17, 19.

The vehicle 60 has a creep speed control system or module 22 which implements a creep function by controlling the torque requested at the electric motors 14, 16 in certain situations, as will be described in greater detail below. In particular, the creep speed control system 22 activates or implements the creep function in dependence on the speed of the vehicle 60. Specifically, the creep function is activated when the vehicle speed is within a predetermined threshold range of a target creep speed, and the system 22 controls the torque requested of the motors 14, 16 such that the vehicle 60 is controlled to reach and/or maintain the target creep speed. The target creep speed may be a relatively low speed vehicle speed, for example, around 6 km/h, and the predetermined threshold range may be from 4 km/h to 12 km/h.

The creep speed control module 22 is configured to activate both: when the vehicle speed reduces to a value in the predetermined threshold range from a speed greater than those values in the predetermined threshold range, e.g. when the driver releases the accelerator pedal; and, when the vehicle speed increases to a value in the predetermined threshold range from a speed less than those values in the predetermined threshold range, e.g. when starting from a standstill in heavy traffic.

Particularly in the first of these cases, entering the creep mode may result in so-called 'backlash' in the driveline. During entry into creep from such an 'overrun' condition, the electric machine 14, 16 torque must go from a negative value (overrun torque) to a positive value, meaning that the gears in the drivelines 17, 19 must transition from being meshed in one direction to being meshed in the opposing direction. The transition from negative torque to positive torque may cause a thump and subsequent oscillations in the drivelines 17, 19, potentially causing discomfort to the driver or eventually damaging the drivelines 17, 19. When the vehicle 60 is decelerating, the vehicle 60 operates in a generating mode in which overrun torque is harvested by the electric motors 14, 16 to charge battery 12.

Whilst decelerating, the vehicle 60 will eventually reach an upper bound of the predetermined threshold creep speed range. At this point, creep speed mode is activated. During creep when the vehicle 60 is in a forward drive gear, the requested torque within the drivelines 17, 19 is positive as the motors 14, 16 provide drive torque to the vehicle 60. There is therefore a point during creep entry at which the requested motor torque reverses and passes through zero. The point at which the requested motor torque passes through zero is referred to as the lash crossing. The relatively sudden change from negative torque to positive torque at this point may cause a sudden jolt, or backlash, which may be uncomfortable for the driver.

In a conventional automatic vehicle with an automatic transmission, the gears within the driveline also change from meshing in one direction to meshing in the opposing direction during the torque reversal. However, in a conventional automatic vehicle the fluid coupling or slipping clutch between the internal combustion engine and the wheels causes a damping effect so as to reduce the effect of backlash. In a conventional automatic vehicle having a slipping clutch, a driveability control function may apply a rate limit or filter to slow the torque request down as it crosses zero requested torque so as to guard against the thump.

In contrast, in the BEV 60 of the present embodiment, the motors 14, 16 are directly or permanently connected to the wheels 18, 20. Hence, unlike in the conventional automatic vehicle, there is no damping within the drivelines 17, 19. Backlash during the lash crossing may therefore occur and be more severe than in the conventional automatic vehicle, causing discomfort to the driver.

The creep speed control system 22 is configured to control the torque requested by the electric motors 14, 16 so as to reduce the effect of backlash in the driveline during the lash crossing, as will be described below.

Figure 2:
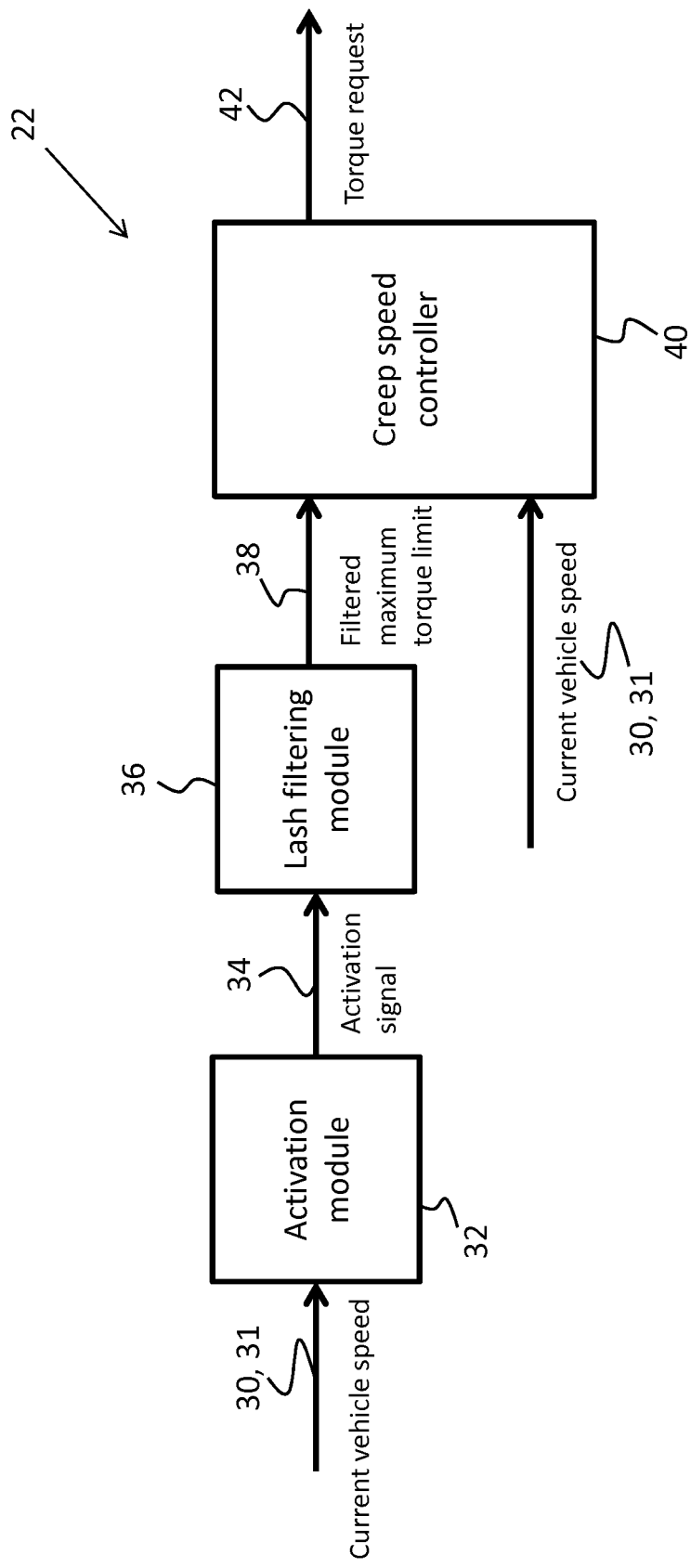
FIG. 2 is a schematic illustration of the creep speed control system of FIG. 1 in greater detail.

FIG. 2 shows the functional components of the creep speed control system 22. In particular, the creep speed control system 22 includes an activation module 32, a lash filtering module 36, and a creep speed controller 40.

The current speed 30 of the vehicle 60 is received at an input 31 of the system 22, in particular at the activation module 32. The activation module 32 determines whether the creep speed controller 40 should be activated based on the received current vehicle speed 30. As described above, if the current vehicle speed 30 is within a predetermined threshold amount of a target creep speed, i.e. in a predetermined threshold creep range, then the activation module 32 outputs an activation signal 34 to the lash filtering module 36. On the other hand, if the current vehicle speed 30 is not within the predetermined threshold target creep speed range, then the activation module 32 does not output the activation signal 34.

If the current vehicle speed 30 is within the threshold of the target creep speed, the activation signal 34 is output by the activation module 32 to the lash filtering module 36, which subsequently outputs a signal 38 activating the creep speed controller 40.

The lash filtering module 36 includes data relating to the maximum torque limit, or maximum allowable torque, for the motors 14, 16. The maximum torque limit may be a limit representing the maximum torque which the motors are able to deliver in consideration of the current operating conditions of the motors, their associated power electronics and the available traction power from the battery.

The lash filtering module 36 applies a filter to this maximum torque limit in order to obtain a so-called filtered maximum torque limit 38, which is output to the creep speed controller 40. The filtered maximum torque limit 38 defines the maximum torque that may be requested of the motors 14, 16 by the creep speed controller 40.

The creep speed controller 40 also receives the current vehicle speed 30 via the input 31. The creep speed controller 40 determines the torque required by the motors 14, 16 connected to the wheels 18, 20 in order for the vehicle 60 to reach and maintain the target creep speed based on the current vehicle speed 30. This requested torque is limited to the received filtered maximum torque limit 38. The creep speed controller 40 then outputs a creep speed control torque request or signal 42, based on the determination and the filtered maximum torque limit 38, which is received at the motors 14, 16. The creep speed controller 40 outputs the creep speed control torque signal 42 to the motors 14, 16 to implement the creep function until receiving a deactivation command signal.

Figure 3:
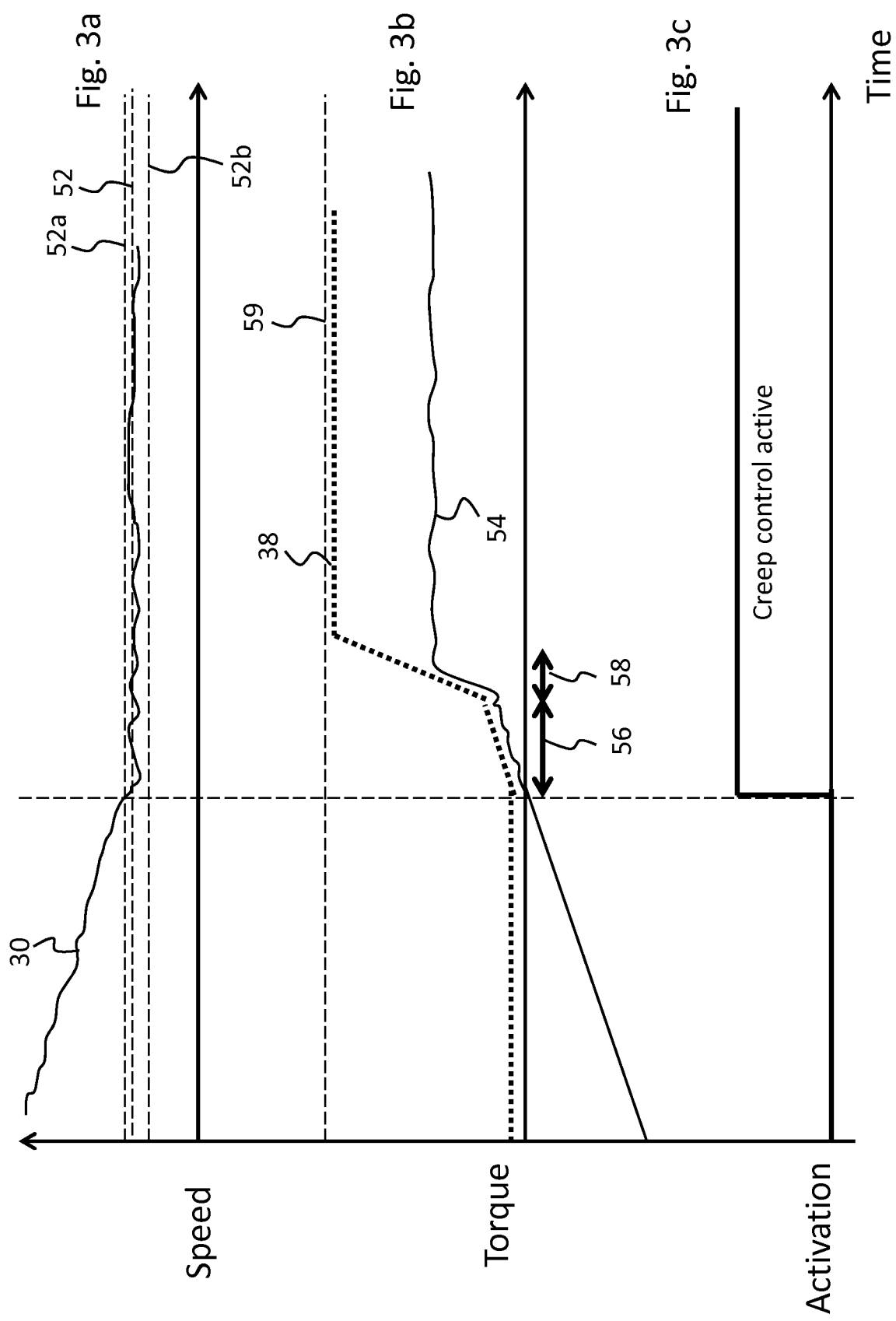
FIG. 3 is a schematic graphical representation of the speed and torque of the vehicle with respect to time, as controlled by the creep speed control system of FIG. 2.

The filtered maximum torque limit 38 varies with time such that the maximum torque which may be requested of the motors 14, 16 may vary with time from the activation of the creep speed controller 40. That is, in the time elapsed since the creep speed control module 22 was activated. This variation of the filtered maximum torque limit 38 limits or reduces the maximum torque that may be requested of the motors 14, 16 to be during the lash crossing, thereby reducing the backlash in the driveline 17, 19. This will be described in further detail with reference to FIG. 3.

The creep control torque request 42 output by the creep speed controller 40 may be combined with a driver demanded torque request in order to obtain a final torque requested from the motors 14, 16. In many cases, the driver demanded torque is zero because the driver is not depressing the accelerator or brake pedal; however, this need not be the case. For example, if the vehicle 60 is traveling up a relatively steep incline with a relatively small positive driver torque demand, then the vehicle 60 may still slow down to the creep speed target value. The driver demanded torque may additionally undergo filtering to determine a maximum torque which may be requested at the motors 14, 16 prior to being combined with the creep speed torque signal 42 from the creep speed controller 40.

The activation module 32 also receives the driver demanded torque as an input. In particular, the activation module 32 outputs a deactivation signal to the creep speed controller 40 when the driver demanded torque is greater than zero and the vehicle speed is greater than the creep speed target value. It may be the case that the creep controller 40 is not deactivated instantly at this point; rather, the above conditions being satisfied triggers a blend function which freezes the current vehicle speed control torque value and then blends it out in dependence on various factors.

FIGS. 3a and 3b show schematic graphs of how the vehicle speed and motor torque vary over time in the vehicle 60 having the creep speed control system 22. Specifically, the graphs illustrate how the vehicle speed and motor torque vary over time in a situation in which the driver releases the accelerator pedal when the vehicle 60 is traveling at a relatively high speed, e.g. 50 km/h. FIG. 3c further illustrates the point at which the creep speed controller 40 is activated.

FIG. 3a shows how the current vehicle speed 30 varies with time, illustrating the creep speed target value 52 as a horizontal dashed line. FIG. 3a also illustrates upper and lower bounds 52a, 52b of the predetermined creep speed threshold range. The vehicle 60 is initially traveling at a speed greater than the upper bound 52a and is decelerating. The vehicle speed 30 eventually decelerates to a speed corresponding with the upper bound 52a. The creep speed controller 40 is activated upon determination by the activation module 32 that the vehicle speed 30 is within the predetermined creep speed threshold range 52 (see FIG. 3c). In particular, the creep speed control module 22 is configured to activate when the current vehicle speed 30 of the vehicle 60 crosses a predetermined threshold above the creep speed target value 52. That is, the creep speed control module 22 activates when the vehicle speed 30 crosses the upper bound 52a from a speed greater than the upper bound 52a to a speed less than the upper bound 52a. Expressed differently, in this case the vehicle 60 is decelerating from a speed greater than the predetermined threshold 52a above the creep speed target value 52 to a speed less than the predetermined threshold 52a.

FIG. 3b illustrates the motor torque 54 with respect to time, corresponding to the vehicle speed 30 in FIG. 3a. The graph 3b shows an example of the variation of torque 54 at either, or both of the motors 14, 16.

With reference to FIG. 3b, whilst the vehicle 60 decelerates the requested motor torque 54 is negative, i.e. overrun torque. As the vehicle speed 30 decreases the requested torque 54 approaches zero. This coincides with the time at which the vehicle speed 30 equals the creep speed target value 52. The creep speed controller 40 activates when the vehicle speed equals the upper bound 52a. The creep speed controller 40 then outputs the speed control torque signal 54 to the 14, 16.

The dashed line 38 in FIG. 3b illustrates how the creep control speed control filtered torque value 38 varies with time. The creep speed controller 40 requests torque in order for the vehicle 60 to reach and maintain the creep speed target value 52. The requested torque is, however, limited by the filtered maximum torque 38.

When the requested torque 54 is negative, the filtered maximum torque 38 is zero. When the creep speed controller 40 activates, the filtered maximum torque limit 38 increases at a first (constant) rate for a first filtering period 56. The torque request 54 is limited to being less than the filtered maximum torque limit 38 during the first filtering period 56. In the example shown, the requested torque 54 closely follows the torque limit 38. This first filtering period 56 may correspond to the period during which it is most likely for backlash to occur in the driveline, i.e. during the torque reversal phase, or the lash crossing. By limiting the value of the torque request 54 of the motors 14, 16 during this period 56, the torque request 54 may only be controlled to increase at a relatively slow rate. Therefore, the torque reversal is not so sudden and backlash within the driveline 17, 19 may be reduced.

After the first filtering period 56, a second filtering period 58 is shown, during which the creep control filtered torque value 38 increases at a second (constant) rate faster than during the first filtering period 56. The torque request 54 initially follows the creep control filtered torque value 38 during this second period 58, until the torque required in order to maintain the creep speed target value 52 is reached. Thereafter, the torque request 54 remains relatively constant to maintain the vehicle speed 30 at the creep speed target value 52. The creep control filtered torque value 38 continues to increase to a speed control maximum torque value 59 at the end of the second period. Thereafter, creep control filtered torque value 38 is constant and equal to the speed control maximum torque value 59. Note that the torque request 54 needed to maintain the vehicle 60 at the creep speed target value 52 is less than the creep control filtered torque value 38 (and hence the speed control maximum torque value 59), and so the torque request 54 does not need to be filtered by the system 22 after the end of the second period 58. Expressed differently, the risk of backlash within the drivelines 17, 19 after the end of the second period becomes zero or negligible.

FIG. 4 is a schematic illustration of the vehicle 60 comprising the creep speed control system 22.

The creep speed control module 22 described above is driver-electable. That is, the vehicle user driver is able to select whether the creep speed control system 22 is enabled, for example via a user interface within the vehicle 60. If the driver prefers not to have a creep function on the vehicle 60, then they may disable the system 22 via the user interface.

FIG. 5 shows the steps of a method 70 performed by the creep speed control system 22. At step 72, the current vehicle speed 30 is received by the input 31. At step 74, the creep speed control module 22 is activated if the vehicle speed 30 lies between the upper and lower bounds 52a, 52b. At step 76, a creep speed control torque signal 42 is sent to the electric motors 14, 16 to control the vehicle speed 30 in dependence on a creep or idle speed target value 52. The speed control torque signal 42 is limited to a speed control filtered torque value 38 less than a speed control maximum torque value 59.

Many modifications may be made to the above examples without departing from the scope of the present invention as defined in the accompanying claims.

In the above-described embodiment, the vehicle 60 has two electric motors 14, 16 that provide drive or brake torque to the front and rear wheels 18, 20; however, in different embodiments the vehicle may be provided with any number of electric motors. For example, the vehicle may be provided with a single electric motor at the front or rear of the vehicle and configured to provide drive or brake torque to the front and/or rear wheels of the vehicle.

In the above-described embodiment, the creep function is activated when the vehicle speed is within a predetermined threshold range; however, in different embodiments the creep function may be activated when the vehicle speed reaches a predetermined (target) threshold creep speed.

In the above-described embodiment, the creep control filtered torque value 38 increases at a constant rate during both the first and second periods 56, 58; however, this need not be the case, and in different embodiments, the creep control filtered torque value 38 increases at a non-constant rate during the first and/or second periods 56, 58.

In the above-described embodiment, there are two filtering periods 56, 58 during which the creep control filtered torque value 38 increases at different rates; however, this need not be the case. In particular, any number of filtering periods may be provided, for example one filtering period.

The invention claimed is:

1. A creep speed control system for a vehicle having at least one electric motor for providing torque to at least one vehicle wheel, the system comprising:
   an input configured to receive a current speed signal indicative of a current speed of the vehicle;

a creep speed control module configured to activate when the current speed of the vehicle crosses a predetermined threshold above a creep speed target value; and an output configured to, upon activation of the creep speed control module, send a creep speed control torque signal to the at least one electric motor to control the speed of the vehicle based at least in part on the creep speed target value, wherein the creep speed control torque signal is limited to a creep speed control filtered torque value less than a creep speed control maximum torque value, and wherein the creep speed control torque signal is limited to the creep speed control filtered torque value during a torque reversal phase in a driveline of the vehicle.

2. A system according to claim 1, wherein the creep speed control filtered torque value becomes equal to the speed control maximum torque value in an overall prescribed filtering period after activation of the creep speed control module.

3. A system according to claim 1, wherein the creep speed control filtered torque value is variable with time.

4. A system according to claim 3, wherein the creep speed control filtered torque value increases with time.

5. A system according to claim 4, wherein the creep speed control filtered torque value increases at a constant rate.

6. A system according to claim 3, wherein the creep speed control filtered torque value increases at a first rate for a first prescribed filtering period less than the overall prescribed filtering period after activation of the creep speed control module.

7. A system according to claim 6, wherein the creep speed control filtered torque value increases at a second rate for a second prescribed filtering period after the first prescribed filtering period, the second rate being greater than the first rate.

8. A system according to claim 6, wherein the creep speed control filtered torque value in the first prescribed filtering period is less than the speed control torque value needed to maintain the vehicle speed at the creep speed target value.

9. A system according to claim 1, wherein the creep speed control filtered torque value is zero when the creep speed control module is activated.

10. A system according to claim 1, wherein the creep speed control module is configured to deactivate when a driver demanded torque is non-zero and the vehicle speed is greater than the creep speed target value.

11. A system according to claim 1, wherein the creep speed control module is selectively operable by the vehicle driver.

12. A creep speed control method for a vehicle having at least one electric motor for providing torque to at least one vehicle wheel, the method comprising:

receiving a current speed signal indicative of a current speed of the vehicle;

activating a creep speed control module when the current speed of the vehicle crosses a predetermined threshold creep speed above a creep speed target value; and upon activation of the creep speed control module, sending a creep speed control torque signal to the at least one electric motor to control the vehicle speed based at least in part on the creep speed target value, wherein the creep speed control torque signal is limited to a creep speed control filtered torque value less than a creep speed control maximum torque value, and wherein the creep speed control torque signal is limited to the creep speed control filtered torque value during a torque reversal phase in a driveline of the vehicle.

13. A vehicle comprising a system according to claim 1.

14. A vehicle according to claim 13, the vehicle comprising a first electric motor to provide torque to at least one front wheel of the vehicle and a second electric motor to provide torque to at least one rear wheel of the vehicle.

15. A non-transitory, computer-readable storage medium storing instructions thereon that when executed by one or more processors causes the one or more processors to carry out the method of claim 12.

16. A vehicle according to claim 13, wherein the vehicle is a battery electric vehicle.

17. A vehicle configured to perform the method of claim 12.

18. A vehicle according to claim 17, wherein the vehicle is a battery electric vehicle.

19. A vehicle according to claim 17, the vehicle comprising a first electric motor to provide torque to at least one front wheel of the vehicle and a second electric motor to provide torque to at least one rear wheel of the vehicle.

* * * * *